United States Patent
Pogorelik et al.

(10) Patent No.: US 9,936,239 B2
(45) Date of Patent: Apr. 3, 2018

(54) MULTIPLE STREAM TUNING

(71) Applicant: Intel Corporation, Santa Clara, CA (US)

(72) Inventors: Oleg Pogorelik, Lapid (IL); Rita H Wouhaybi, Portland, OR (US); Alex Nayshtut, Gan Yavne, D (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/195,203

(22) Filed: Jun. 28, 2016

(65) Prior Publication Data

US 2017/0374402 A1  Dec. 28, 2017

(51) Int. Cl.

| | | |
|---|---|---|
| H04H 60/32 | (2008.01) | |
| H04N 21/258 | (2011.01) | |
| H04L 29/08 | (2006.01) | |
| H04L 29/06 | (2006.01) | |
| H04L 12/26 | (2006.01) | |
| G06F 17/30 | (2006.01) | |
| H04N 21/61 | (2011.01) | |
| H04N 21/84 | (2011.01) | |
| H04N 21/438 | (2011.01) | |
| H04N 21/44 | (2011.01) | |
| H04N 21/4784 | (2011.01) | |
| H04N 21/4147 | (2011.01) | |

(Continued)

(52) U.S. Cl.
CPC ... *H04N 21/25891* (2013.01); *G06F 17/3084* (2013.01); *G06F 17/30743* (2013.01); *G06F 17/30817* (2013.01); *H04L 43/04* (2013.01); *H04L 65/60* (2013.01); *H04L 67/22* (2013.01); *H04L 67/306* (2013.01); *H04N 21/4147* (2013.01); *H04N 21/4382* (2013.01); *H04N 21/44008* (2013.01); *H04N 21/44204* (2013.01); *H04N 21/4532* (2013.01); *H04N 21/4784* (2013.01); *H04N 21/6125* (2013.01); *H04N 21/84* (2013.01)

(58) Field of Classification Search
CPC combination set(s) only.
See application file for complete search history.

(56) References Cited

U.S. PATENT DOCUMENTS

| | | |
|---|---|---|
| 6,005,597 A | 12/1999 | Barrett et al. |
| 7,594,244 B2 | 9/2009 | Scholl et al. |

(Continued)

OTHER PUBLICATIONS

"International Application Serial No. PCT/US2017/039526, International Search Report dated Oct. 30, 2017", 3 pgs.

(Continued)

*Primary Examiner* — Mulugeta Mengesha
(74) *Attorney, Agent, or Firm* — Schwegman Lundberg & Woessner, P.A.

(57) ABSTRACT

System and techniques for multiple stream tuning are described herein. A plurality of content streams may be received. The plurality of content streams may be ranked. A user attention level may be scored as the user observes at least one content stream of the plurality of content streams. The user attention level and a rank for the at least one content stream may be compared to remaining ranks of the plurality of content streams to produce a difference. A stream action may be performed on a set of content streams from the plurality of content streams based on the difference.

18 Claims, 5 Drawing Sheets

(51) Int. Cl.
*H04N 21/45* (2011.01)
*H04N 21/442* (2011.01)

(56) References Cited

U.S. PATENT DOCUMENTS

| | | | |
|---|---|---|---|
| 8,793,727 B2* | 7/2014 | Serdiuk | A61B 5/0002 |
| | | | 725/36 |
| 2006/0251382 A1 | 11/2006 | Vronay et al. | |
| 2013/0086489 A1 | 4/2013 | Fleischman et al. | |
| 2013/0205314 A1* | 8/2013 | Ramaswamy | H04N 21/44213 |
| | | | 725/14 |
| 2014/0026156 A1 | 1/2014 | Deephanphongs | |
| 2014/0122069 A1* | 5/2014 | Bravin | G10L 15/183 |
| | | | 704/235 |
| 2016/0328384 A1* | 11/2016 | Divakaran | G06F 17/2785 |

OTHER PUBLICATIONS

"International Application Serial No. PCT/US2017/039526, Written Opinion dated Oct. 30, 2017", 7 pgs.

* cited by examiner

MULTIPLE STREAM TUNING

TECHNICAL FIELD

Embodiments described herein generally relate to video channel tuning and more specifically to multiple stream tuning.

BACKGROUND

Video channel tuning, such as selecting programming in broadcast or cable television systems, involves the navigation and selection of a video content stream from a number of available streams. Often programming for these streams is published to allow users to identify channels and times in which to find desired programming.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
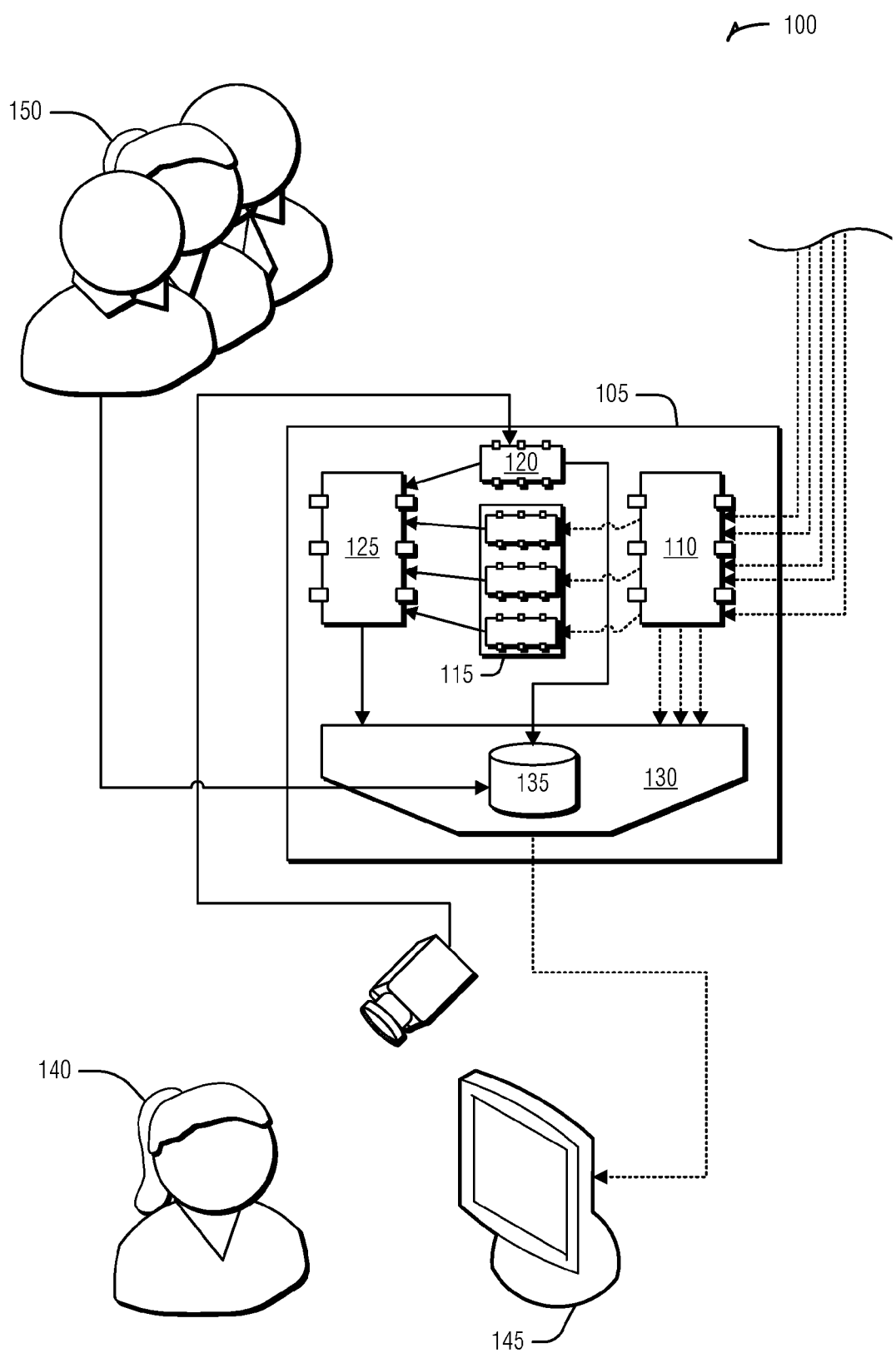
FIG. 1 is a block diagram of an example of an environment including a system for multiple stream tuning, according to an embodiment.

With the present explosion of information sources, including channels, the problem of obtaining information is not one of scarcity, but rather a problem of locating desired information the ocean of video streams, channels, and other content sources. This problem, may be exacerbated when mass media (e.g., television) is considered due to the generally single channel attention devices and users may devote to such media. For example, user watching a television channel may have to track the schedules of the alternative programs to avoid missing an interesting event. The problem may be worsened for events that do not have schedules, such as breaking news, stock exchange reports, a surprise play in a boring game, etc.

Some users may frequently switch between several channels or streams attempting to catch important events or content. Having to make such frequent switches often negatively impacts the viewer's ability to enjoy content, reducing the user experience. Further, these viewers may miss important details when switching into an event that is already underway or become frustrated after missing critical event information that happened in the background. Additionally, by constantly switching away from current content when there is no other event taking place may negatively impact the viewer's enjoyment of that content as well.

Current solutions to the above mentioned problem may include Picture In Picture (PIP) (e.g., watching more than one stream at a time) or an automated scheduler based switcher to automatically change channels. These techniques allow concurrent viewing of a limited number of streams and still leave the user responsible what to watch and why to switch from one channel to another. Further, these techniques do not adequately address live events and may require complicated "programming," reducing their effectiveness for unsophisticated users.

To address the technological difficulties noted above, the presently described systems and techniques incorporate a multi-stream ranking based on observable user behavior with regard to content signals in the streams. Thus, individuals may be assured that they will not miss important events while being freed from personally monitoring these streams or manually switching between the streams. By implementing a system controller in a video/audio device to provide real-time evaluation of stream content, the system may make intelligent switching choices on behalf of the user. This evaluation may employ an interest score (IS) or rank specific to each viewer (e.g., a selected spectator), emulating the choices the viewer herself would make. Channel switching may not be appropriate, or desired in all circumstances. The system may, instead of switching to the other channel, also notify (e.g., prompt) the user, put the event in a PIP window, play the event in the background, adjust audio (e.g., make louder or softer) or video (e.g., make brighter, dimmer, change contrast, saturation levels, etc.) settings to facilitate communication with the user about the event occurrence.

Content evaluation may be based on using image or speech recognition engines scanning the video or audio streams of the channels. These recognition engines may apply pre-trained, or explicit models to recognize event triggers relevant to the user. The engines may then instigate predefined consequent actions when one of the triggering patterns are matched. These predefined consequent actions direct audio or video selection and display mechanisms to render the content to the viewer, or to communicate to the viewer in another fashion, such as via a textual message to a user communication device.

Interest scores or ranks will be calculated using User Interest Profile (UIP) that is learned and refined with user observations over time. The system monitors a user's behavior, such as which channels are selected, when channel changes occur, emotional cues (e.g., sentiment analysis on image or audio of the user captured during viewing, alerts, automatic channel changes, etc.), interests and selections of similar users, etc. Ranking content based on user reaction or interaction with that content provides a robust and ever-improving mechanism by which to correctly gauge user interest in content not currently visible to users, switching the viewing or audio device to deliver that content, all without forcing the user to understand, much less manual intervene, in the process.

Implementing the system and techniques provided herein provides the following benefits over present techniques. The user experience is improved by deliver content in a timely manner without forcing the user to switch channels himself. A reliable way in which critical or important live events are tracked is delivered, for example, using the content ranks from numerous users. The system is scalable by relieving users and developers from explicitly defining the content interest rules; these matching patterns rather grow with the users as additional user observations are noted and incorporated into present models. Further, the system extends simple user observations with unique advanced interaction scenarios cases such as emotion-based channel selection or crowd sourced event rating. In short, the present systems and techniques permit an attention-free mechanism to deliver interesting content to users without extensive user programming or schedule management and without extensive developer interference, providing a benefit over the PIP or automatic scheduling systems of today.

FIG. 1 is a block diagram of an example of an environment 100 including a system 105 for multiple stream tuning, according to an embodiment. The system 105 includes a decoder 110, a content sensor array 115, a sensor 120, a comparator 125, and a switch 130. The decoder 110 is arranged to receive a plurality of content streams. The decoder 110 provides the content streams to the switch 130 for eventual display on a monitor 145 or the like, and also provides the streams to the content sensor array 115 for evaluation. The decoder 110 is implemented to interface with a network, antenna, or other wide area receiver to obtain stream data. The decoder is 110 also arranged to decode the stream data into a time-series of image and sounds to be consumed by other components or presented on the monitor 145. The decoding may include digital file format decoding, NTSC decoding, or the like. As illustrated, the dotted lined represent the movement of the content streams through the system 105, where eventually a single one of the streams is displayed on the monitor 145. The solid lines indicate intra component messaging to ultimately select the content stream to be displayed.

The content sensor array 115 is arranged to rank the plurality of content streams. This ranking includes evaluating image, audio, or metadata of a content stream against a user profile (e.g., UIP). In an example, the content sensor array 115 includes a plurality of content sensors. In an example, the content sensory array 115 includes a content sensor for each content stream. In an example, to rank the plurality of content streams includes, for each of the plurality of content streams, a content sensor is to apply a set of assays to a content stream to produce a set of artifacts. In an example, a member of set of assays is automatic speech recognition (ASR). In this example, a member of the set of artifacts that correspond to the ASR assay is a string (e.g., a transcription or description of utterance or sounds present in an audio portion of the content stream). In an example, at least one of a recurrent neural network (RNN), a moving window applied to a deep belief network (DBN), or a moving window on a convolutional network are trained to implement the ASR.

In an example, a member of the set of assays is a visual classifier. In this example, a member of the set of artifacts include an object identification corresponding to the output of the visual classifier. Such object identification may include a face (e.g., identifying a celebrity face), a context (e.g., baseball field), or simply the object itself. In an example, the visual classifier operates on still image samples of the content stream. In an example, the visual classifier operates on video samples of the content stream, the samples being a subset of the content stream. This example differs from video classifiers that are often implement with some feedback neural networks. The design of still image classifiers tends to be sufficient for the present purposes while reducing the hardware and training costs associated with video classifiers. In an example, the visual classifier is arranged to perform optical character recognition (OCR). In this example, the object identification takes the form of a string (e.g., words, phrases, sentences, etc.) describing the object identification. Thus, if an image of a cat is successfully classified, the object identification may simply be "cat." However, it is understood that more complex strings may be used, such as "grey cat" or even a parseable format, such as Javascript Object Notation (JSON), such as 'animal {"species": "cat", "color": "grey", "size": "large", "name": {"first": "Whiskers", "last": "McWhiskerface"}}.'

The classifiers described above may be updated via firmware or the like after installation, as well as through the operation of the sensor 120 and a training apparatus of the system 105. That is, over time, as user choices are made with regard to content stream selections (e.g., a user immediately overrides a content stream selection) the underlying classifiers are modified (e.g., re-trained to incorporate the additional feedback) and updated. In this manner, the content sensor array 115 evolves with the user 140.

The sensor 120 is arranged to score a user attention level as the user 140 observes at least one content stream of the plurality of content streams. As illustrated, the sensor 120 is attached to a camera to observe the user 140 visually. The sensor 120 may also incorporate or be attached to a microphone, a non-visible light sensor (e.g., an infrared proximity sensor), an ultrasonic sensor, an electromagnetic sensor, or even a social network sensor—e.g., an interface or robot that examines posts or activities of the user 140 in other forums, such as a social network, message board, etc.—to gather observations of the user 104.

In an example, the sensor 120 is arranged to observe the user action in a sample period and to calculate an attention score for the user action. A user action is a discernable activity of the user during the sample period. For example, the user action may be to watch the monitor 145. This action may receive a higher attention score than, for example, remaining in front of the monitor 145 but looking at a handheld device. Such an action may indicate that the present content stream is somewhat interesting but not interesting enough given whatever is on the user's device. In a further example, a user action may be for the user to manually changed to an alternate channel, thus suggesting that the user was not interested (e.g., a low attention score) in the present content stream.

In an example, to observe the user action, the sensor 120 is arranged to evaluate one or more images of the user during the sample period with sentiment analysis. In an example, to observe the user action includes the sensor to evaluate a voice sample with sentiment analysis. Sentiment analysis provides an emotional quantification of the user's state. Example emotions commonly available to automated sentiment analysis include disgust, anger, happiness or satisfaction, and boredom. In an example, to observe the user action includes the sensor 120 to receive a user rating of subject matter corresponding to the sample period. In this example, the user's explicit participation in rating the content of a given stream may be contemporaneously paired with the present content stream. Thus, if the user like the present content stream, a preferences for the aspects of that content stream will be incorporated into the sensor array 115, to provide a better user experience in the future.

The comparator 125 is arranged to compare the user attention level and a rank for the at least one content stream to remaining ranks of the plurality of content streams to produce a difference. That is, the content streams are ranked by the sensor array 115. The present user attention level is also scored by the sensor 120. When a content stream with a high rank is presented, the comparator 125 will rate that content stream more favorably against the current stream, suggesting that the switch 130 present the new, higher ranked content stream. If, however, the user attention level is such that a switch may be problematic, the comparator 125 will instruct the switch to take another stream action, such as send a notification to the user's phone, provide the new content stream in a PIP, etc. Example problematic user attention levels may include an attention level indicating that the user is very focused on the current content stream, really enjoys the current content stream, or is focused on something else entirely (e.g., an incoming phone call). In each of these cases, merely switching to the new content stream may injure the user experience or cause the rendering of the content stream to interfere with a life event (e.g., represented via the call, or an argument with someone in the room, or an accident, etc.). The comparator 125 balances both the content stream ranking (e.g., the result of evaluating the probable value of a content stream to the user 140) and the user's attention to the present content stream, which may be a proxy for content streams generally (e.g., a complete lack of attention may be taken as a queue not to further impose on the user 140 at this time.).

The switch 130 is arranged to perform a stream action on a set of content streams from the plurality of content streams based on the difference. The stream action pertains to a stream, such as displaying the content stream to the monitor 145. However, given a second content stream in the plurality of content streams (e.g., a current or new content stream), the following are examples of stream actions. In an example, the stream action is to replace a current content stream on a screen with the second content stream when the second content stream has a higher rank than the current content stream. In an example, the stream action is to replace a current audio stream with an audio stream from a second content stream that has a higher rank that the current audio stream. In an example, the stream action is to place the second content stream in a picture-in-picture container on a screen when the second content. In an example, the stream action is to record the second content stream. In an example, the stream action is to modify the volume of an audio portion of the second content stream. In an example, the stream action is to render a notification to the user regarding the second content stream.

The switch 130 may also incorporate a user context 135 in its switching decisions. The user context 135 operates as a real-time modification of the sensor array 115 on the ranked streams coming from the comparator 125. Thus, user feedback that has not yet been incorporated into the content sensor array 115 may be evaluated by the switch 130. Thus, in an example, the switch 130 is arranged to modify a rank for the content stream based on artifact evaluations, the artifacts produced by the content sensor 115 of the content sensor array 115. In an example, the switch 130 is arranged to evaluate the set of artifacts in the user context 135 for the user 140 to produce the artifact evaluations. In an example, to evaluate the set of artifacts in the user context includes the switch 130 to perform a semantic comparison between text in the string and tokens in the user context. In an example, the switch 130 is arranged to correlate the attention score to one or more tokens from a content stream during the sample period, and update the user context to include a modified attention score for the one or more tokens. Here, the tokens including a score corresponding to user action in regard to subject matter corresponding to the tokens are used to modify the user context 135. For example, the string may include a description of a fantastic sports play (e.g., an unexpected interception), the switch 130 switching the content stream to the monitor 145 so that the user 140 may observe the conclusion to the event. The user 140 then immediately switches the channel back. The user context may here discount or ignore the description of the play for future channel switching operations in light of the user's observed reaction of resetting the channel.

In an example, wherein the user context 135 includes a matching group to a set of users 150. To evaluate the set of artifacts in the user context 135 includes the switch 130 to use a portion of a second user context from a member of the set of users 150 to produce the artifact evaluations. This technique is a valuable addition when there is limited user context 135 or content sensor array 115 training with regard to the user 140 and a given content stream. Peers 150 may be matched to the user 140 on a number of demographic bases, such as age, economic status, location, relationship status, professed interests, group membership, etc. Often, peers 150 may be provided user context information on a content stream, the values of which may be inferred to the user 140. These inferences allow the system 105 to fill in knowledge gaps about the user 140 while still providing a responsive and accurate content stream selection for the user 140.

Figure 2:
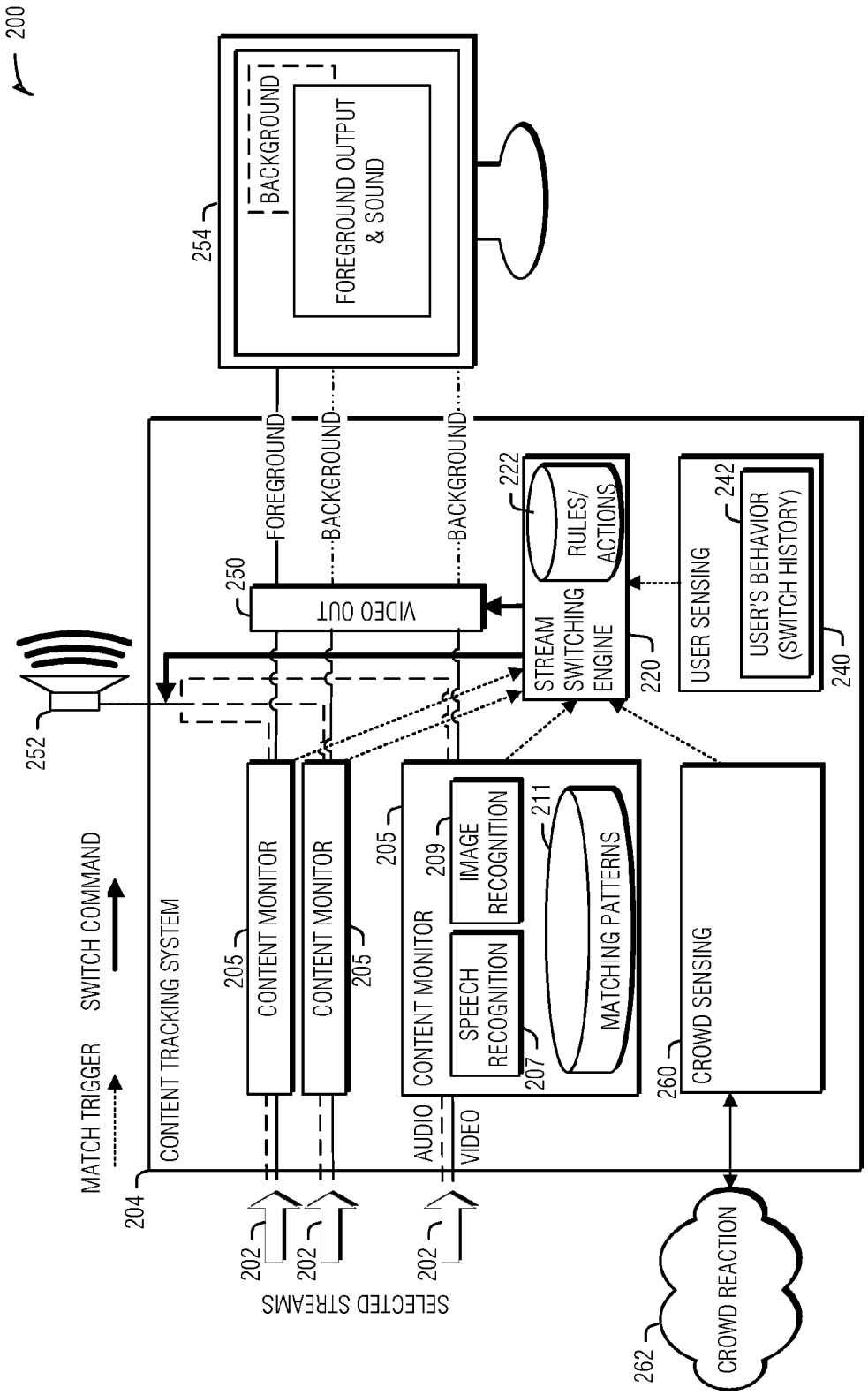
FIG. 2 illustrates a block diagram of an example of a system for multiple stream tuning, according to an embodiment.

FIG. 2 illustrates a block diagram of an example of a system 200 for multiple stream tuning, according to an embodiment. The system 200 includes a content tracking system 204, a speaker 252, and a monitor 254. As illustrated, a plurality of content streams 202 are communicatively coupled to the content tracking system 204 when it is in operation. This coupling may take many forms, such as via a network connection in which stream content is packetized and shares a physical resources (e.g., channels stream over the Internet) or via a broadcast (whether wired (e.g., coax cable) or wireless (e.g., over-the-air broadcast television)).

Upon the stream paths lie one or more content monitors 205. As illustrated, each stream 202 has a content monitor 205. Also, as illustrated, the dashed lines represent an audio stream path and the thin solid lines represent the video stream paths. A content monitor 205 may include a speech recognizer 207, an image recognizer 209, and a data store 211 of patterns to match by the recognizers. Each of the speech recognizer 207 and the image recognizer 209 are implemented in computer hardware and embody one or more classifiers or statistical engines used for such purposes. These mechanisms allow the content monitor 205 to detect images or words/phrases from predefined list, for example. If one or more matching patterns are detected in a stream 202, the content monitor 205 will retrieve a corresponding action within the stream switching engine's repertoire, such as "Switch to", "Record", "Play Message", etc. The content monitor 205 may then initiate a match trigger (dotted line) to the stream switching engine 220. In an example, the match trigger takes the form of a packetized message, such as "Switch Request {Input Stream ID, Required Action, Priority, Timeout}."

The user sensing engine 240 is subsystem that implements a variety of techniques to incorporate observable user behavior to update or modify the content scoring of the content monitors 205. Example user behaviors that may be monitored and acted upon include selecting particular channels at given times or a user's emotional reactions to particular scenes of a stream 202, to uttered keywords or phrases. This learning provides a user context to the stream switching engine 220 directly in the form of match triggers based on, for example, a user being bored (e.g., visual sentiment analysis), talking on the phone (e.g., audible sampling), or channel surfing. The results of the user sensing engine 240 may also provide the basis for updating the matching patterns of the content monitors 205 (e.g., by looking for keywords of a topic that currently interests the user), or correcting/updating classifiers of the speech recognizer 207 (e.g., updating an ASR model to incorporate a speech impediment) or image recognizer 209. In an example, the user sensing engine 240 or the content monitors 205 may implement, or be connected to, a user interface allowing a user to select keywords from the table of predefined keywords and phrases or define personal dictionary of words, to invoke match triggers. Consequent actions for match triggers will be selected from the list of pre-defined or learned operations supported by a specific device and defined by original equipment manufacturer.

The stream switching engine 220 includes one or more input and output ports as well as a switch between them for managing audio and video output. For example, an input port may accept match triggers and the output ports may interface with the speaker 252 (or an audio mixer of the speaker 252) and a video output driver 250 (e.g., a video card, mixer, etc.). As illustrated, output port connections are represented by a thick solid line connecting the stream switching engine 220 to the speaker input line and the video output driver 250. By accepting and acting on match triggers, the stream switching engine 220 displays stream contents accordance with predefined rules and actual content "interest status" as received from the user sensing engine 240. If more than one stream is to be shown based on stream rankings (e.g., as determined from match trigger messages), the stream switching engine 220 may resolve conflicts by ignoring a match trigger, randomly choosing a stream 202, or delaying context switch by, for example, say recording the stream 202 that is not shown.

With these components, the content tracking system 204 provides the following services: running several streams, selecting content to render on an output device (e.g., the speaker 252 or monitor 254), translating speech to text for further matching of stream content and a model of user desired content, matching images from video content (e.g., snapshot based with varying frequency) to perform content matching with the user model, switching streams by criteria based on the user model (e.g., special keyword, phrase, time, time period, etc.), and recording audio or video when there is contention between output resources and content ranking.

Although the user context and model building produced from the user sensing engine 240, recorded in the user behavior store 242), situations may arise in which no opportunity has yet arisen to observe a user for a given set of circumstances. Here, the content tracking system 204 may be enhanced with the crowd sensing engine 260. The crowd sensing engine 260 is coupled, when in operation, to a plurality of user data feeds 262 of other users. The data feeds may include switch decisions of peers (e.g., correlated users based on demographic, similar content selection profile, similarity in overlapping switching decisions, or explicit designation by the users themselves).

An example of the system 200 in action may include a user that has tuned the television to a sports channel. The user's cellular phone rings that the user lowers the television's volume. Sentiment and content analysis indicates that the user is talking to a loved one. During this conversation, unexpectedly, a player on a favored team (identified via previous user interactions online or in the living room) steals the ball. The user sensing engine 240 detects an increased heart rate, audio activity, and physical motions of other people (e.g., peers) watching the event from different households. However, the user is not looking at the monitor 254 (as detected by a local sensors such as a camera). As the stream switching engine 220 consults the action table 222, the match triggers indicate that the correct stream 202 is being displayed but the user context requires an additional action, that of sending an alert message to the user's fitness wearable, the message stating, "Team might score". Now, the user's gaze may travel to the TV screen. With the change in user attention, the stream switching engine 240 may turn on closed captions, allowing the user to listen to the call while keeping up with the action. As noted above, the actions 242 may be learned based on what the user might have done in the past, and shared through crowd reactions 262 to enhance the content tracking system's efficacy.

Figure 3:
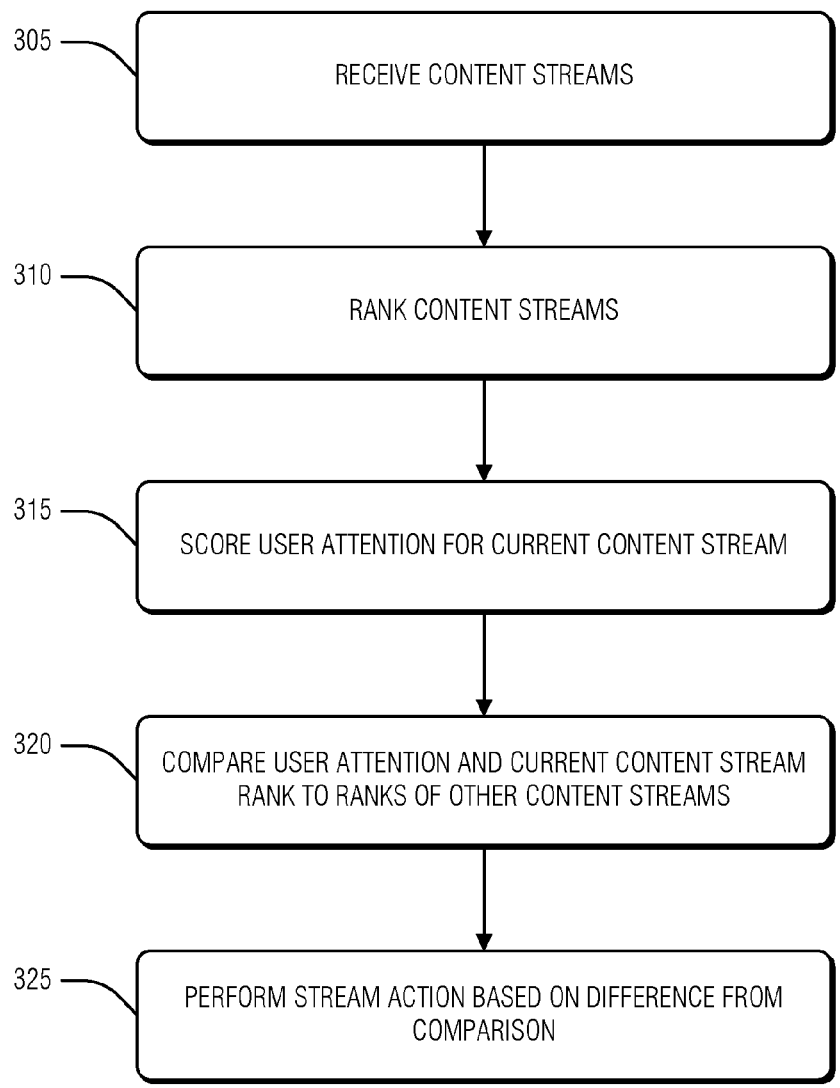
FIG. 3 illustrates a flow diagram of an example of a method for multiple stream tuning, according to an embodiment.

FIG. 3 illustrates a flow diagram of an example of a method 300 for multiple stream tuning, according to an embodiment. The operations of the method 300 are implemented in computer hardware, such as that described above and below with respect to FIGS. 1, 2, and 4 (e.g., circuitry).

At operation 305 a plurality of content streams is received.

At operation 310 the plurality of content streams is ranked. In an example, ranking the plurality of content streams includes, for each of the plurality of content streams, the individual streams will be assayed, the assay results will be evaluated, and the result will be used to modify the stream rank.

In an example, assaying the stream includes applying a set of assays to a content stream to produce a set of artifacts. In an example, a member of set of assays is automatic speech recognition (ASR). In an example, a member of the set of artifacts that correspond to the ASR assay is a string. In an example, at least one of a recurrent neural network (RNN), a moving window applied to a deep belief network (DBN), or a moving window on a convolutional network are trained to implement the ASR.

In an example, a member of the set of assays is a visual classifier. In an example, a member of the set of artifacts include an object identification corresponding to the output of the visual classifier. In an example, the visual classifier operates on still image samples of the content stream. In an example, the visual classifier operates on video samples of the content stream, the samples being a subset of the content stream. In an example, the visual classifier performs optical character recognition (OCR), and wherein the object identification is a string.

In an example, evaluating the assay results includes evaluating the set of artifacts in a user context for the user to produce artifact evaluations. In an example, evaluating the set of artifacts in the user context includes performing a semantic comparison between text in the string and tokens in the user context, the tokens including a score corresponding to user action in regard to subject matter corresponding to the tokens. In an example, the user context includes a matching group to a set of users, and wherein evaluating the set of artifacts in a user context includes using a portion of a second user context from a member of the set of users to produce the artifact evaluations. In an example, modifying a rank for the content stream is based on the artifact evaluations.

At operation 315 a user attention level is scored as the user observes at least one content stream of the plurality of content streams.

At operation 320 the user attention level and a rank for the at least one content stream are compared to remaining ranks of the plurality of content streams to produce a difference.

At operation 325 a stream action is performed on a set of content streams from the plurality of content streams based on the difference. In an example, given a second content stream in the plurality of content streams, the stream action includes replacing a current content stream on a screen with the second content stream when the second content stream has a higher rank than the current content stream. In an example, the stream action includes replacing a current audio stream with an audio stream from a second content stream that has a higher rank that the current audio stream. In an example, the stream action includes placing the second content stream in a picture-in-picture container on a screen when the second content. In an example, the stream action includes recording the second content stream. In an example, the stream action includes modifying the volume of an audio portion of the second content stream. In an example, the stream action includes rendering a notification to the user regarding the second content stream.

The operations of the method 300 may also include a technique to update user context by observing the user. The following operations discuss this technique.

The user action may be observed in a sample period. In an example, one or more images of the user during the sample period may be evaluated with sentiment analysis. In an example, a user rating of subject matter corresponding to the sample period may be received. In an example, a voice sample may be evaluated with sentiment analysis.

An attention score for the user action may be calculated.

The attention score may be correlated to one or more tokens from a content stream during the sample period.

The user context may be updated to include a modified attention score for the one or more tokens.

Figure 4:
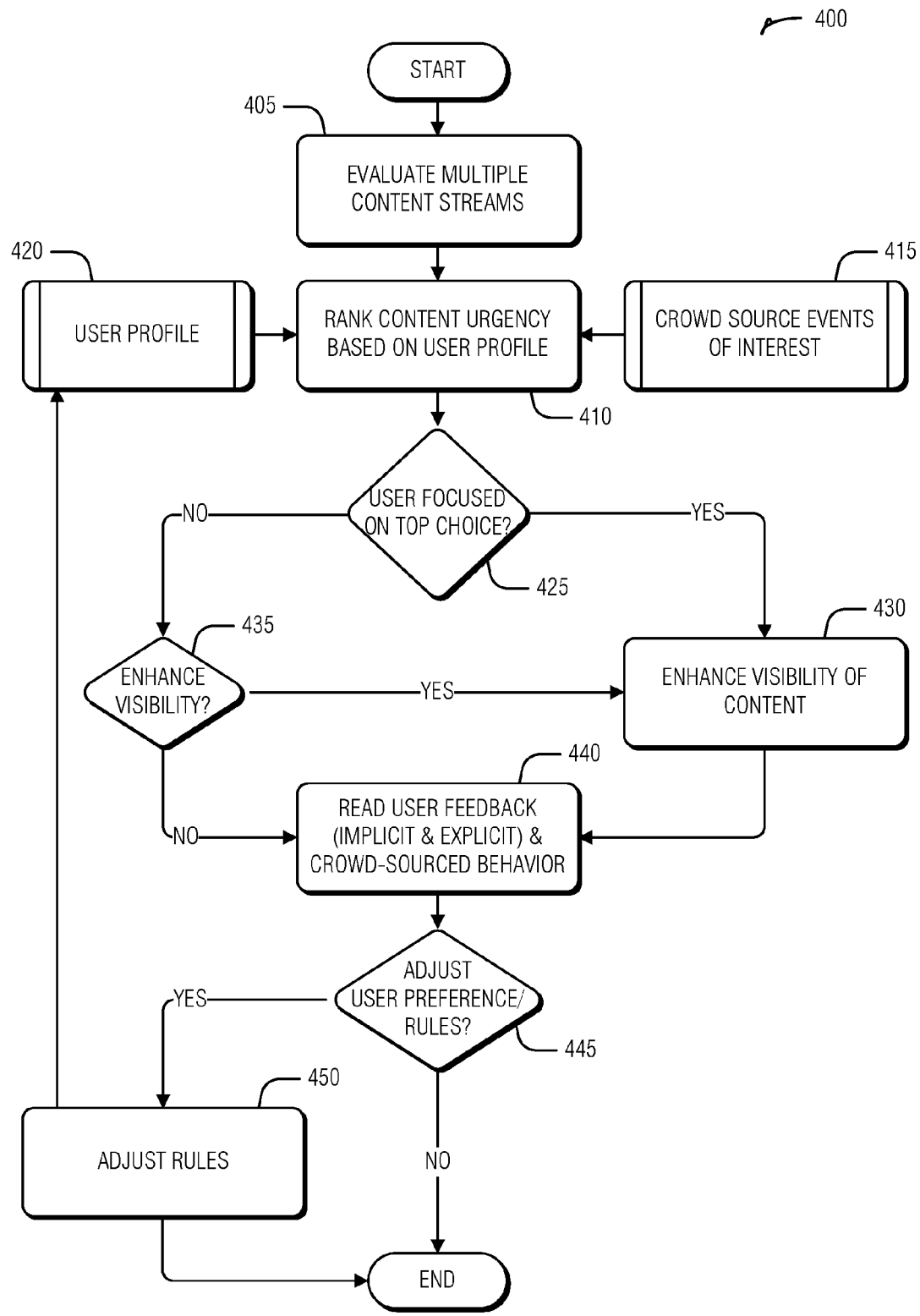
FIG. 4 illustrates a flow diagram of an example of a method for multiple stream tuning, according to an embodiment.

FIG. 4 illustrates a flow diagram of an example of a method 400 for multiple stream tuning, according to an embodiment. The operations of the method 400 are implemented in computer hardware, such as that described above and below with respect to FIGS. 1, 2, and 4 (e.g., circuitry).

At the beginning of a particular evaluation period, multiple content streams are evaluated (e.g., operation 405) for content (e.g., what is being shown). The content is then evaluated in the context of the user profile 420 and possibly user profiles or activities of other users 415 (e.g., operation 410). The result of the content ranking allows the question as to whether the user is focused on the top choice (as determined by the ranking of operation 410) (e.g., decision 425).

If the user is not focused (e.g., watching) the top choice stream, the system evaluates whether to enhance the visibility of the content (e.g., decision 435). In some circumstances, such as the user is on the phone, no action will be taken (e.g., moving on to operation 440). In other circumstances, the method 400 will enhance the content's visibility (e.g., operation 430). Visibility enhancement may take several forms, such as displaying the preferred content on the main (e.g., only) screen, increasing the volume, sending a notification to the user via text, email, etc., among others. If the user is already focused on the top choice, the visibility enhancement may be subtle or simply omitted.

After the system has taken action (e.g., visibility enhancement), implicit and explicit feedback is collected from the user (e.g., operation 440.) Implicit feedback is gathered via the systems sensors, and includes such things as sentiment analysis from video, image, or audio data collected prior to, during, or after the visibility enhancement, or noting whether or not the user changed the channel soon after the visibility enhancement, undid the enhancement (e.g., lowered the volume in response to the volume being raised), or simply accepted the enhancement through inaction. Explicit feedback may include a rating, or use of another user interface to manual correct a mistake of the system.

After the implicit and explicit feedback is collected, the way in which the feedback is incorporated is determined (e.g., decision 445). Some feedback may lack the confidence, specificity, or timeliness to be effective in bettering the system. Such feedback may be ignored and the method 400 will end (for this iteration). However, some feedback is used to adjust the matching, preference, or other rules, models, classifiers, and settings present in the user profile 420. This updated user profile may be used in the future increase the system's sensitivity to the user's preferences.

Figure 5:
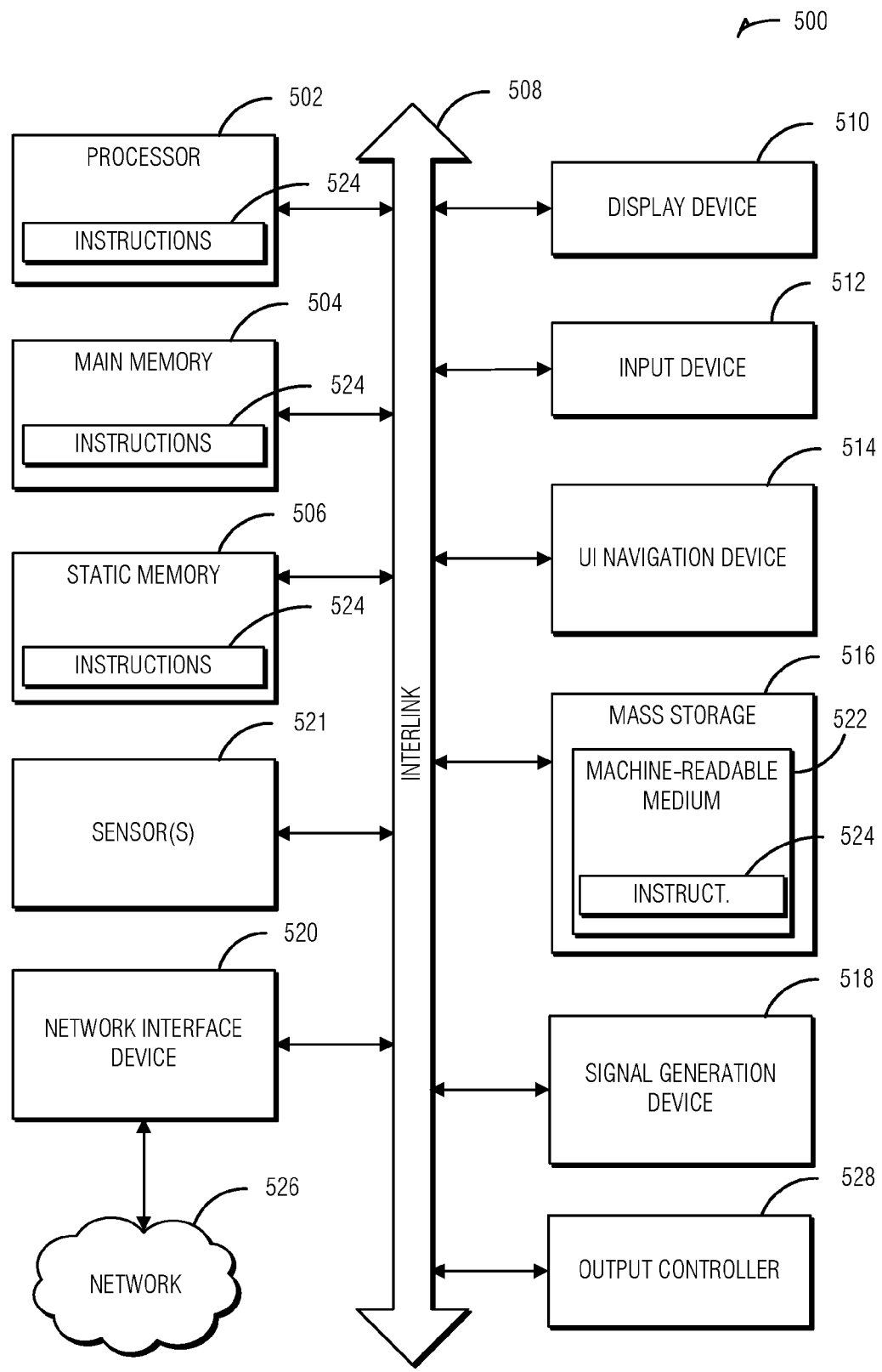
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES & EXAMPLES

Example 1 is a system for multiple stream tuning, the system comprising: a decoder to receive a plurality of content streams; a content sensor array to rank the plurality of content streams; a sensor to score a user attention level as the user observes at least one content stream of the plurality of content streams; a comparator to compare the user attention level and a rank for the at least one content stream to remaining ranks of the plurality of content streams to produce a difference; and a switch to perform a stream action on a set of content streams from the plurality of content streams based on the difference.

In Example 2, the subject matter of Example 1 optionally includes wherein to rank the plurality of content streams includes, for each of the plurality of content streams, a content sensor is to apply a set of assays to a content stream to produce a set of artifacts, and wherein the switch is to: evaluate the set of artifacts in a user context for the user to produce artifact evaluations; and modify a rank for the content stream based on the artifact evaluations.

In Example 3, the subject matter of Example 2 optionally includes wherein a member of set of assays is automatic speech recognition (ASR), and wherein a member of the set of artifacts that correspond to the ASR assay is a string.

In Example 4, the subject matter of Example 3 optionally includes wherein at least one of a recurrent neural network (RNN), a moving window applied to a deep belief network (DBN), or a moving window on a convolutional network are trained to implement the ASR.

In Example 5, the subject matter of any one or more of Examples 2-4 optionally include wherein a member of the set of assays is a visual classifier, and wherein a member of the set of artifacts include an object identification corresponding to the output of the visual classifier.

In Example 6, the subject matter of Example 5 optionally includes wherein the visual classifier operates on still image samples of the content stream.

In Example 7, the subject matter of any one or more of Examples 5-6 optionally include wherein the visual classifier operates on video samples of the content stream, the samples being a subset of the content stream.

In Example 8, the subject matter of any one or more of Examples 5-7 optionally include wherein the visual classifier is arranged to perform optical character recognition (OCR), and wherein the object identification is a string.

In Example 9, the subject matter of any one or more of Examples 3-8 optionally include wherein to evaluate the set of artifacts in the user context includes to switch to perform a semantic comparison between text in the string and tokens in the user context, the tokens including a score corresponding to user action in regard to subject matter corresponding to the tokens.

In Example 10, the subject matter of Example 9 optionally includes wherein the sensor is to: observe the user action in a sample period; calculate an attention score for the user action; and wherein the switch is to: correlate the attention score to one or more tokens from a content stream during the sample period; and update the user context to include a modified attention score for the one or more tokens.

In Example 11, the subject matter of Example 10 optionally includes wherein to observe the user action includes the sensor to at least one of: evaluate one or more images of the user during the sample period with sentiment analysis; receive a user rating of subject matter corresponding to the sample period; or evaluate a voice sample with sentiment analysis.

In Example 12, the subject matter of any one or more of Examples 2-11 optionally include wherein the user context includes a matching group to a set of users, and wherein to evaluate the set of artifacts in a user context includes the switch to use a portion of a second user context from a member of the set of users to produce the artifact evaluations.

In Example 13, the subject matter of any one or more of Examples 1-12 optionally include wherein, given a second content stream in the plurality of content streams, the stream action is at least one of the switch to: replace a current content stream on a screen with the second content stream when the second content stream has a higher rank than the current content stream; replace a current audio stream with an audio stream from a second content stream that has a higher rank that the current audio stream; place the second content stream in a picture-in-picture container on a screen when the second content; record the second content stream; modify the volume of an audio portion of the second content stream; or render a notification to the user regarding the second content stream.

Example 14 is a method for multiple stream tuning, the method comprising: receiving a plurality of content streams; ranking the plurality of content streams; scoring a user attention level as the user observes at least one content stream of the plurality of content streams; comparing the user attention level and a rank for the at least one content stream to remaining ranks of the plurality of content streams to produce a difference; and performing a stream action on a set of content streams from the plurality of content streams based on the difference.

In Example 15, the subject matter of Example 14 optionally includes wherein ranking the plurality of content streams includes, for each of the plurality of content streams: applying a set of assays to a content stream to produce a set of artifacts; evaluating the set of artifacts in a user context for the user to produce artifact evaluations; and modifying a rank for the content stream based on the artifact evaluations.

In Example 16, the subject matter of Example 15 optionally includes wherein a member of set of assays is automatic speech recognition (ASR), and wherein a member of the set of artifacts that correspond to the ASR assay is a string.

In Example 17, the subject matter of Example 16 optionally includes wherein at least one of a recurrent neural network (RNN), a moving window applied to a deep belief network (DBN), or a moving window on a convolutional network are trained to implement the ASR.

In Example 18, the subject matter of any one or more of Examples 15-17 optionally include wherein a member of the set of assays is a visual classifier, and wherein a member of the set of artifacts include an object identification corresponding to the output of the visual classifier.

In Example 19, the subject matter of Example 18 optionally includes wherein the visual classifier operates on still image samples of the content stream.

In Example 20, the subject matter of any one or more of Examples 18-19 optionally include wherein the visual classifier operates on video samples of the content stream, the samples being a subset of the content stream.

In Example 21, the subject matter of any one or more of Examples 18-20 optionally include wherein the visual classifier performs optical character recognition (OCR), and wherein the object identification is a string.

In Example 22, the subject matter of any one or more of Examples 16-21 optionally include wherein evaluating the set of artifacts in the user context includes performing a semantic comparison between text in the string and tokens in the user context, the tokens including a score corresponding to user action in regard to subject matter corresponding to the tokens.

In Example 23, the subject matter of Example 22 optionally includes observing the user action in a sample period; calculating an attention score for the user action; correlating the attention score to one or more tokens from a content stream during the sample period; and updating the user context to include a modified attention score for the one or more tokens.

In Example 24, the subject matter of Example 23 optionally includes wherein observing the user action includes at least one of: evaluating one or more images of the user during the sample period with sentiment analysis; receiving a user rating of subject matter corresponding to the sample period; or evaluating a voice sample with sentiment analysis.

In Example 25, the subject matter of any one or more of Examples 15-24 optionally include wherein the user context includes a matching group to a set of users, and wherein evaluating the set of artifacts in a user context includes using a portion of a second user context from a member of the set of users to produce the artifact evaluations.

In Example 26, the subject matter of any one or more of Examples 14-25 optionally include wherein, given a second content stream in the plurality of content streams, the stream action is at least one of: replacing a current content stream on a screen with the second content stream when the second content stream has a higher rank than the current content stream; replacing a current audio stream with an audio stream from a second content stream that has a higher rank that the current audio stream; placing the second content stream in a picture-in-picture container on a screen when the second content; recording the second content stream; modifying the volume of an audio portion of the second content stream; or rendering a notification to the user regarding the second content stream.

Example 27 is a machine readable medium including instructions that, when executed by a machine, cause the machine to perform any method of Examples 14-26.

Example 28 is a system including means to perform any method of Examples 14-26.

Example 29 is a system for multiple stream tuning, the system comprising: means for receiving a plurality of content streams; means for ranking the plurality of content streams; means for scoring a user attention level as the user observes at least one content stream of the plurality of content streams; means for comparing the user attention level and a rank for the at least one content stream to remaining ranks of the plurality of content streams to produce a difference; and means for performing a stream action on a set of content streams from the plurality of content streams based on the difference.

In Example 30, the subject matter of Example 29 optionally includes wherein the means for ranking the plurality of content streams includes, for each of the plurality of content streams: means for applying a set of assays to a content stream to produce a set of artifacts; means for evaluating the set of artifacts in a user context for the user to produce artifact evaluations; and means for modifying a rank for the content stream based on the artifact evaluations.

In Example 31, the subject matter of Example 30 optionally includes wherein a member of set of assays is automatic speech recognition (ASR), and wherein a member of the set of artifacts that correspond to the ASR assay is a string.

In Example 32, the subject matter of Example 31 optionally includes wherein at least one of a recurrent neural network (RNN), a moving window applied to a deep belief network (DBN), or a moving window on a convolutional network are trained to implement the ASR.

In Example 33, the subject matter of any one or more of Examples 30-32 optionally include wherein a member of the set of assays is a visual classifier, and wherein a member of the set of artifacts include an object identification corresponding to the output of the visual classifier.

In Example 34, the subject matter of Example 33 optionally includes wherein the visual classifier operates on still image samples of the content stream.

In Example 35, the subject matter of any one or more of Examples 33-34 optionally include wherein the visual classifier operates on video samples of the content stream, the samples being a subset of the content stream.

In Example 36, the subject matter of any one or more of Examples 33-35 optionally include wherein the visual classifier performs optical character recognition (OCR), and wherein the object identification is a string.

In Example 37, the subject matter of any one or more of Examples 31-36 optionally include wherein the means for evaluating the set of artifacts in the user context includes means for performing a semantic comparison between text in the string and tokens in the user context, the tokens including a score corresponding to user action in regard to subject matter corresponding to the tokens.

In Example 38, the subject matter of Example 37 optionally includes means for observing the user action in a sample period; means for calculating an attention score for the user action; means for correlating the attention score to one or more tokens from a content stream during the sample period; and means for updating the user context to include a modified attention score for the one or more tokens.

In Example 39, the subject matter of Example 38 optionally includes wherein the means for observing the user action includes at least one of: means for evaluating one or more images of the user during the sample period with sentiment analysis; means for receiving a user rating of subject matter corresponding to the sample period; or means for evaluating a voice sample with sentiment analysis.

In Example 40, the subject matter of any one or more of Examples 30-39 optionally include wherein the user context includes a matching group to a set of users, and wherein the means for evaluating the set of artifacts in a user context includes means for using a portion of a second user context from a member of the set of users to produce the artifact evaluations.

In Example 41, the subject matter of any one or more of Examples 29-40 optionally include wherein, given a second content stream in the plurality of content streams, the stream action is at least one of: replacing a current content stream on a screen with the second content stream when the second content stream has a higher rank than the current content stream; replacing a current audio stream with an audio stream from a second content stream that has a higher rank that the current audio stream; placing the second content stream in a picture-in-picture container on a screen when the second content; recording the second content stream; modifying the volume of an audio portion of the second content stream; or rendering a notification to the user regarding the second content stream.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. system for multiple stream tuning, the system comprising:
   a decoder to receive a plurality of content streams;
   a content sensor array to rank the plurality of content streams, wherein to rank the plurality of content streams includes, for each of the plurality of content streams, the content sensor is to apply a set of assays to a content stream to produce a set of artifacts;
   a sensor to score a user attention level as the user observes at least one content stream of the plurality of content streams;
   a comparator to compare the user attention level and a rank for the at least one content stream to remaining ranks of the plurality of content streams to produce a difference; and
   a switch to:
      perform a stream action on a set of content streams from the plurality of content streams based on the difference;
      evaluate the set of artifacts in a user context for the user to produce artifact evaluations, wherein the user context includes a matching group to a set of users, and wherein to evaluate the set of artifacts in a user context includes the switch to use a portion of a second user context from a member of the set of users to produce the artifact evaluations; and
      modify a rank for the content stream based on the artifact evaluations.

2. The system of claim 1, wherein a member of set of assays is automatic speech recognition (ASR), and wherein a member of the set of artifacts that correspond to the ASR assay is a string.

3. The system of claim 1, wherein a member of the set of assays is a visual classifier, and wherein a member of the set of artifacts include an object identification corresponding to the output of the visual classifier.

4. The system of claim 2, wherein to evaluate the set of artifacts in the user context includes the switch to perform a semantic comparison between text in the string and tokens in the user context, the tokens including a score corresponding to user action in regard to subject matter corresponding to the tokens.

5. The system of claim 4, wherein the sensor is to:
   observe the user action in a sample period;
   calculate an attention score for the user action; and
   wherein the switch is to:
   correlate the attention score to one or more tokens from a content stream during the sample period; and
   update the user context to include a modified attention score for the one or more tokens.

6. The system of claim 1, wherein, given a second content stream in the plurality of content streams, the stream action is at least one of the switch to:
   replace a current content stream on a screen with the second content stream when the second content stream has a higher rank than the current content stream;
   replace a current audio stream with an audio stream from a second content stream that has a higher rank that the current audio stream;
   place the second content stream in a picture-in-picture container on a screen when the second content;
   record the second content stream;
   modify the volume of an audio portion of the second content stream; or
   render a notification to the user regarding the second content stream.

7. A method for multiple stream tuning, the method comprising:
   receiving a plurality of content streams;
   ranking the plurality of content streams, wherein ranking the plurality of content streams includes, for each of the plurality of content streams:
      applying a set of assays to a content stream to produce a set of artifacts;
      evaluating the set of artifacts in a user context for the user to produce artifact evaluations, wherein the user context includes a matching group to a set of users, and wherein evaluating the set of artifacts in a user context includes using a portion of a second user context from a member of the set of users to produce the artifact evaluations; and
      modifying a rank for the content stream based on the artifact evaluations;
   scoring a user attention level as the user observes at least one content stream of the plurality of content streams;
   comparing the user attention level and a rank for the at least one content stream to remaining ranks of the plurality of content streams to produce a difference; and
   performing a stream action on a set of content streams from the plurality of content streams based on the difference.

8. The method of claim 7, wherein a member of set of assays is automatic speech recognition (ASR), and wherein a member of the set of artifacts that correspond to the ASR assay is a string.

9. The method of claim 7, wherein a member of the set of assays is a visual classifier, and wherein a member of the set of artifacts include an object identification corresponding to the output of the visual classifier.

10. The method of claim 8, wherein evaluating the set of artifacts in the user context includes performing a semantic comparison between text in the string and tokens in the user context, the tokens including a score corresponding to user action in regard to subject matter corresponding to the tokens.

11. The method of claim 10, comprising:
    observing the user action in a sample period;
    calculating an attention score for the user action;
    correlating the attention score to one or more tokens from a content stream during the sample period; and
    updating the user context to include a modified attention score for the one or more tokens.

12. The method of claim 7, wherein, given a second content stream in the plurality of content streams, the stream action is at least one of:
    replacing a current content stream on a screen with the second content stream when the second content stream has a higher rank than the current content stream;
    replacing a current audio stream with an audio stream from a second content stream that has a higher rank that the current audio stream;
    placing the second content stream in a picture-in-picture container on a screen when the second content;
    recording the second content stream;
    modifying the volume of an audio portion of the second content stream; or
    rendering a notification to the user regarding the second content stream.

13. At least one non-transitory machine readable medium including instructions for multiple stream tuning, the instructions, when executed by a machine, causing the machine to:
  receive a plurality of content streams;
  rank the plurality of content streams, wherein, to rank the plurality of content streams includes, for each of the plurality of content streams, includes the instructions to cause the machine to:
    apply a set of assays to a content stream to produce a set of artifacts;
    evaluate the set of artifacts in a user context the user to produce artifact evaluations, wherein the user context includes a matching group to a set of users, and wherein, evaluate the set of artifacts in a user context, the machine is to us a portion of a second user context from a member of the set of users to produce the artifact evaluations; and
    modify a rank for the content stream based on the artifact evaluations;
  score a user attention level as the user observes at least one content stream of the plurality of content streams;
  compare the user attention level and a rank for the at least one content stream to remaining ranks of the plurality of content streams to produce a difference; and
  perform a stream action on a set of content streams from the plurality of content streams based on the difference.

14. The at least one machine readable medium of claim 13, wherein a member of set of assays is automatic speech recognition (ASR), and wherein a member of the set of artifacts that correspond to the ASR assay is a string.

15. The at least one machine readable medium of claim 13, wherein a member of the set of assays is a visual classifier, and wherein a member of the set of artifacts include an object identification corresponding to the output of the visual classifier.

16. The at least one machine readable medium of claim 14, wherein to evaluate the set of artifacts in the user context includes the machine to perform a semantic comparison between text in the string and tokens in the user context, the tokens including a score corresponding to user action in regard to subject matter corresponding to the tokens.

17. The at least one machine readable medium of claim 16, wherein the instructions further cause the machine to:
  observe the user action in a sample period;
  calculate an attention score for the user action; and
  wherein the switch is to:
    correlate the attention score to one or more tokens from a content stream during the sample period; and
    update the user context to include a modified attention for the one or more tokens.

18. The at least one machine readable medium of claim 13, wherein, given a second content stream in the plurality of content streams, the stream action is at least one of the machine to:
  replace a current content stream on a screen with the second content stream when the second content stream has a higher rank than the current content stream;
  replace a current audio stream with an audio stream from a second content stream that has a higher rank that the current audio stream;
  place the second content stream in a picture-in-picture container on a screen when the second content;
  record the second content stream;
  modify the volume of an audio portion of the second content stream; or
  render a notification to the user regarding the second content stream.

* * * * *

UNITED STATES PATENT AND TRADEMARK OFFICE
CERTIFICATE OF CORRECTION

PATENT NO. : 9,936,239 B2
APPLICATION NO. : 15/195203
DATED : April 3, 2018
INVENTOR(S) : Pogorelik et al.

It is certified that error appears in the above-identified patent and that said Letters Patent is hereby corrected as shown below:

In the Claims

In Column 17, Line 7, in Claim 1, before "system", insert --A--

In Column 19, Line 12, in Claim 13, after "context", insert --for--

In Column 19, Line 16, in Claim 13, delete "us" and insert --use-- therefor

In Column 20, Line 14, in Claim 20, after "attention", insert --score--

Signed and Sealed this
Fourth Day of June, 2019

Andrei Iancu
*Director of the United States Patent and Trademark Office*